April 2, 1963    L. MARINI    3,083,847
LOAD TRANSFERRING INSTALLATION
Filed July 23, 1958    6 Sheets-Sheet 4
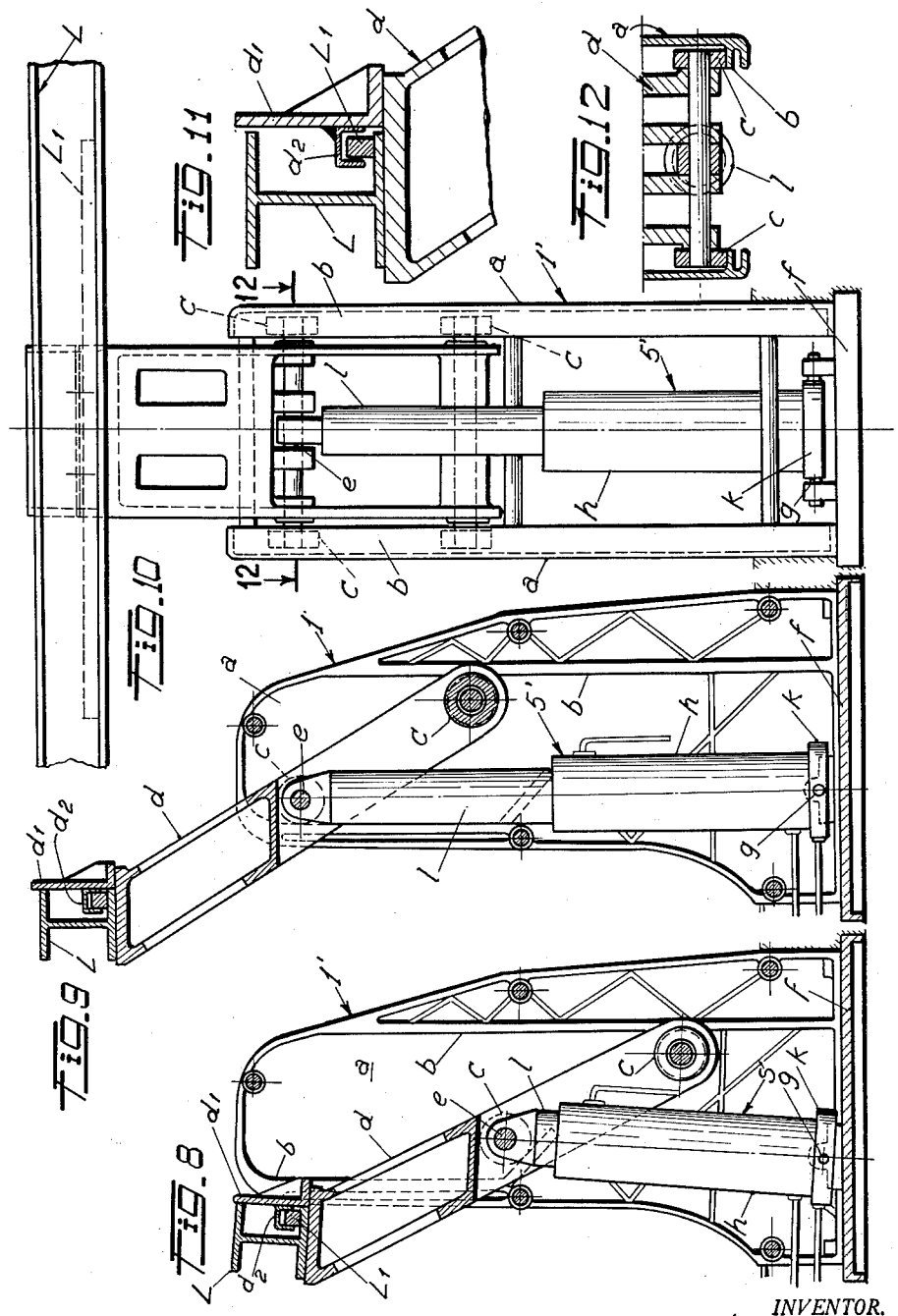
INVENTOR.
Luigi Marini
BY Michael S. Striker
Attorney April 2, 1963  L. MARINI  3,083,847
LOAD TRANSFERRING INSTALLATION
Filed July 23, 1958  6 Sheets-Sheet 5
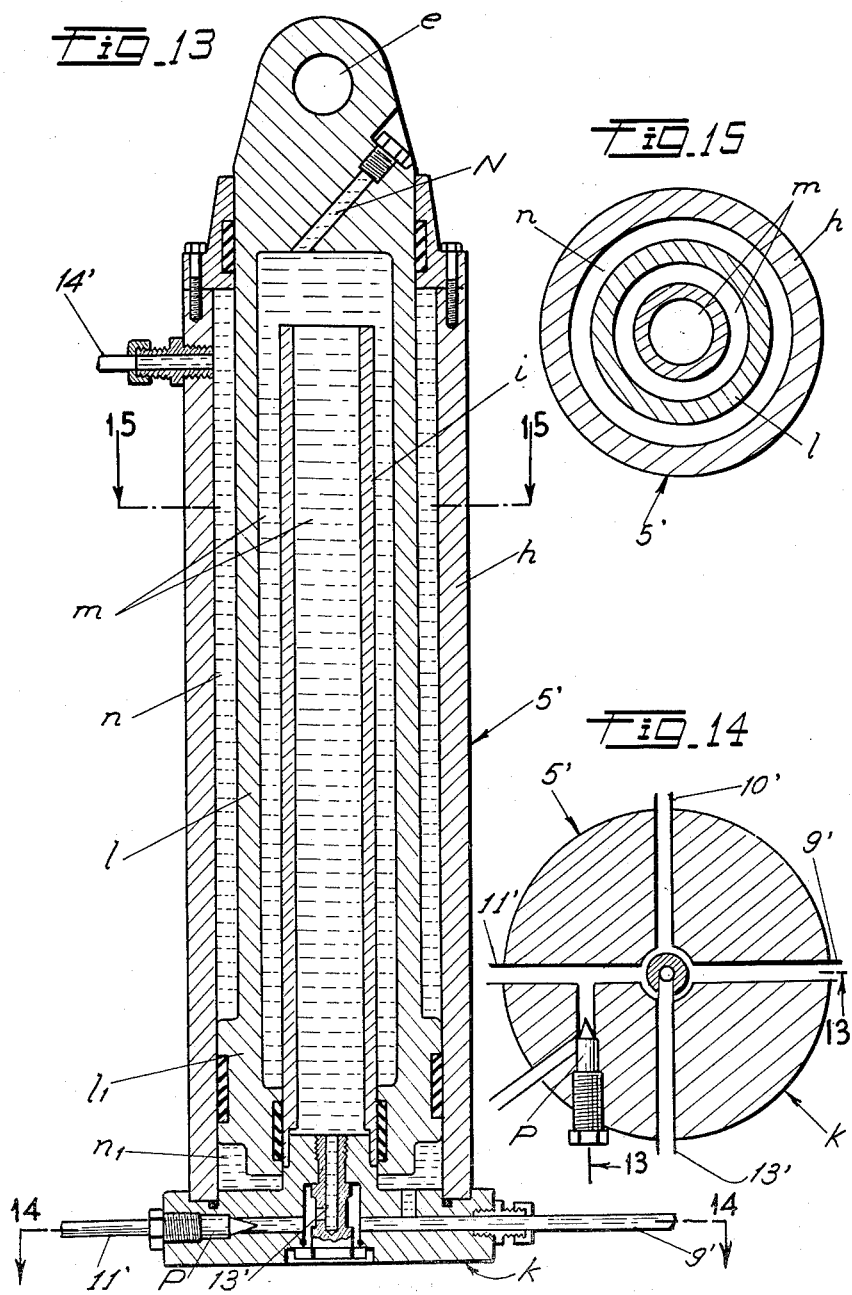
INVENTOR.
Luigi Marini
BY Michael S. Striker

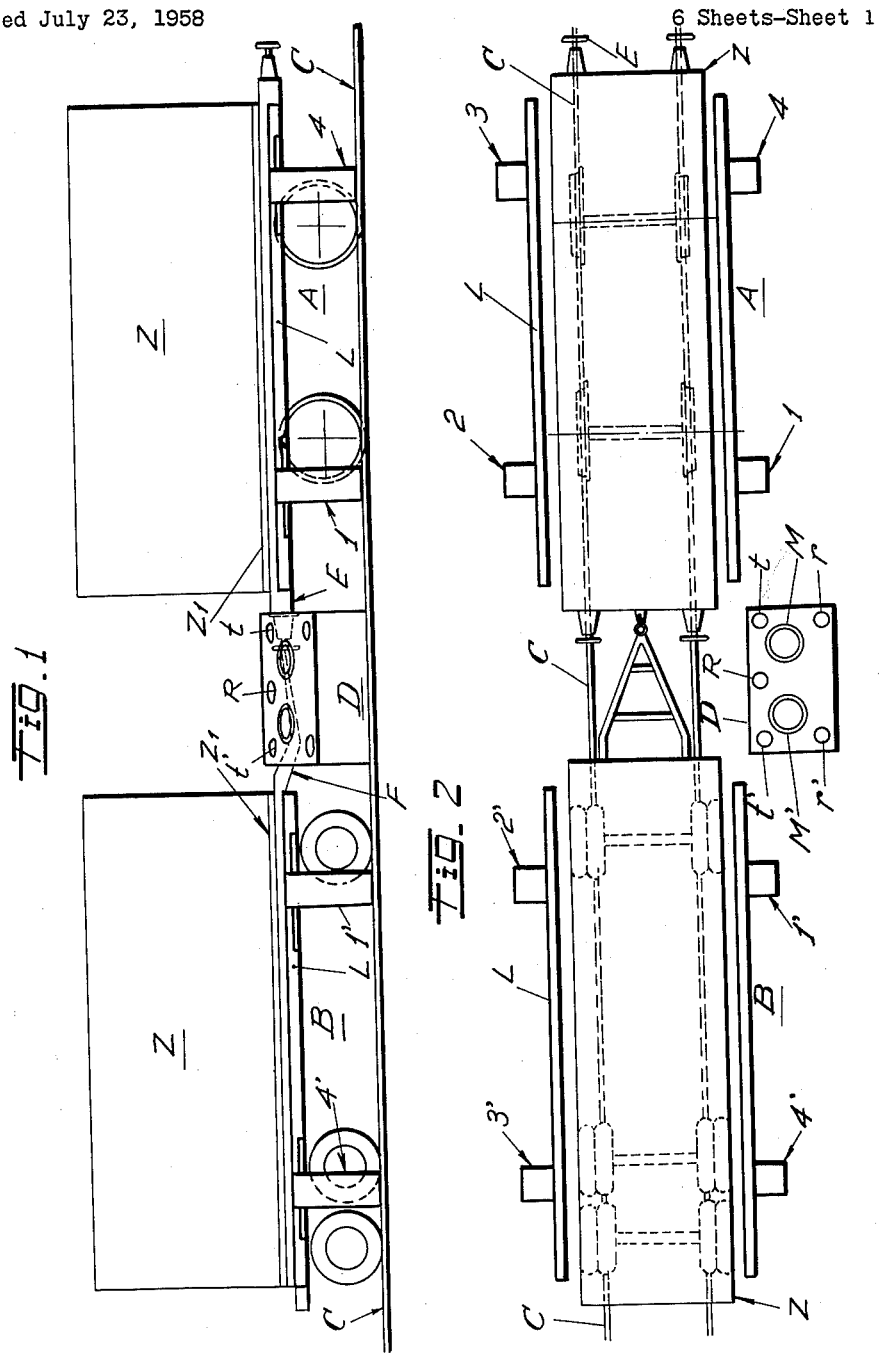

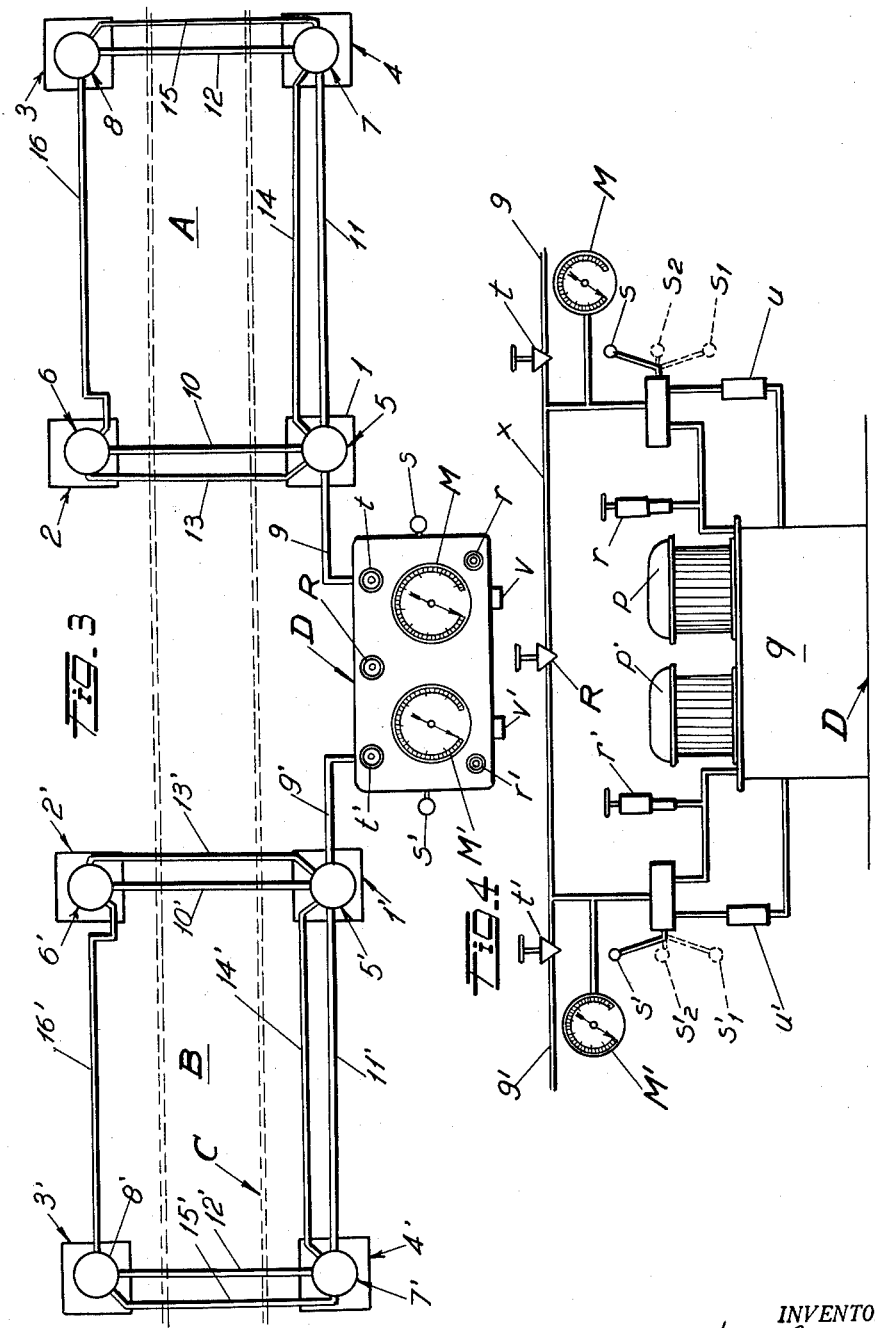

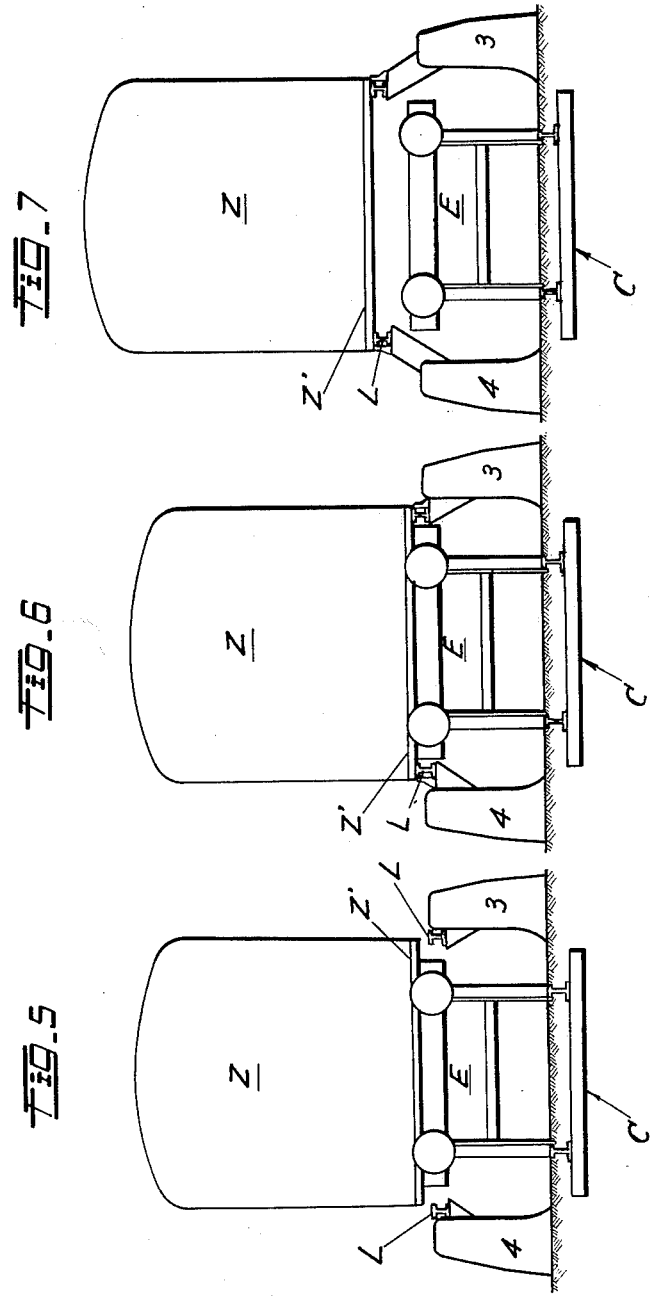

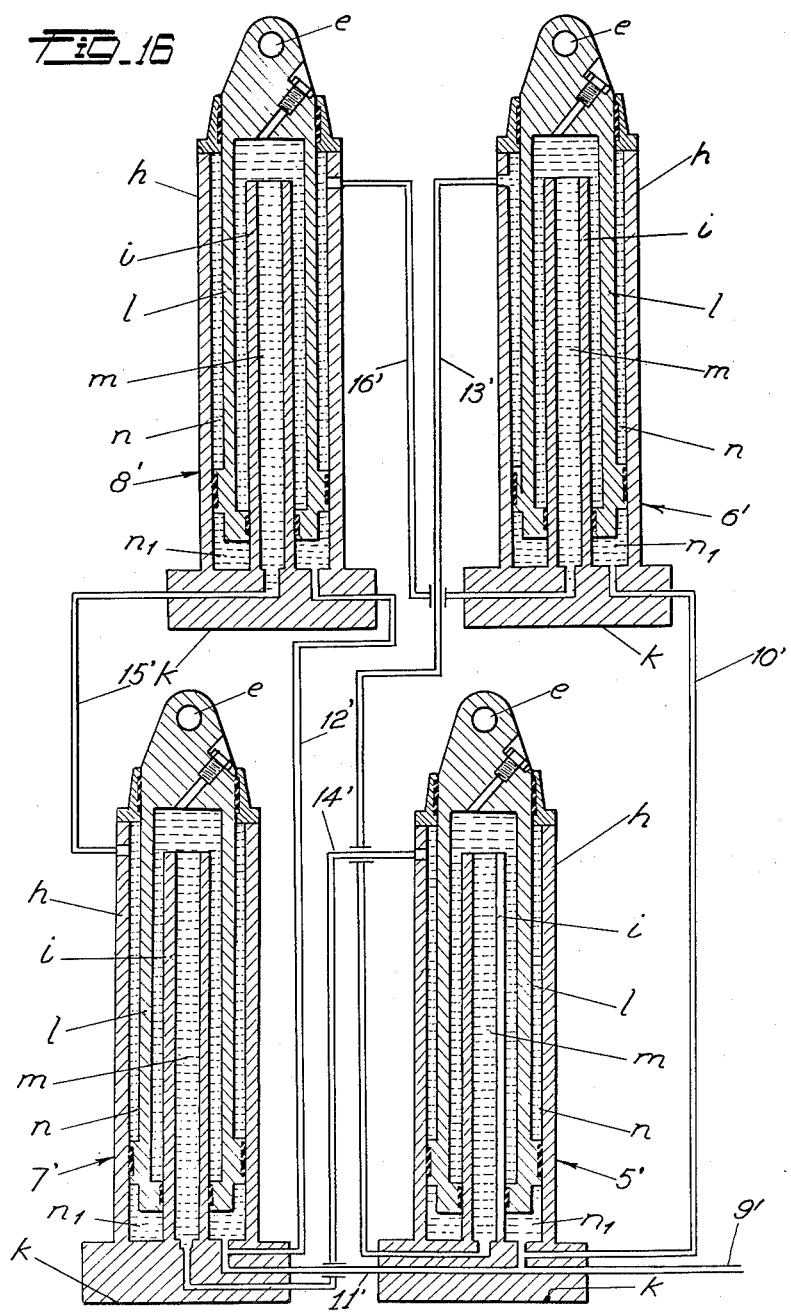

United States Patent Office 3,083,847
Patented Apr. 2, 1963

3,083,847
LOAD TRANSFERRING INSTALLATION
Luigi Marini, Piazza Bertarelli 4, Milan, Italy
Filed July 23, 1958, Ser. No. 750,449
Claims priority, application Italy Apr. 26, 1958
1 Claim. (Cl. 214—38)

This invention relates to a load transferring installation especially adapted to facilitate the transfer or shifting of heavy loads from a motor driven carrying conveyance to a railway freight vehicle and vice versa.

Other arrangements are known for door to door delivery of heavy goods by means of combined road-rail conveyances which are suitable for transferring heavy loads from a road carrier to a rail vehicle and vice versa, at one or more stations along the delivery route. However, in general these consist of apparatus by which the loads are transferred together with the road-carrier or part thereof (for instance a semi-trailer), or else the carrier is furnished with suitable containers to hold the goods to be transferred. Generally the transferring apparatus is equipped with suitable devices to lower, raise and sustain the load aloft during the shifting operation, in which case the apparatus is either bulky and has a considerable dead-weight, or the supporting facilities for the shifting arrangements and apparatus are weak, expensive and cumbersome, permitting operation only with certain types of cargo, and often requiring specially made railway freight cars and road vehicles. All of these and other drawbacks are eliminated by the apparatus conceived according to this invention.

It is accordingly an object of this invention to provide a load transferring installation which allows the use of standard freight railway "car-frames" and road carrying car-frames, without any modification of their structures, except for that portion thereof which actually receives the cargo.

It is furthermore an object of this invention to provide a cargo transferring installation which allows the employment of light weight containers consisting only of a box or open case to hold the cargo while it is in transit.

It is also an object of this invention to provide a cargo transferring installation which allows transfer of extremely heavy loads of cargo with ease.

It is an additional object of this invention to provide a cargo transferring installation which allows the transfer of cargo to be conducted with great safety and without requiring specialized labour.

It is still another object of this invention to provide a cargo transferring installation which, owing to the elementary, rapid and easy way of transferring and reloading the cargo on the spot, makes the delivery of goods swift and prompt without excessive manipulation of the cargoes themselves at points of departure or arrival, which cargoes may be perishable or fragile.

With the above and many other objects in view the invention includes the provision of a loading apparatus which includes, in combination, interchangeable containers for a cargo or load on standard railroad car frames which are free to move along a railroad track adjacent the apparatus, frames of standard road vehicles, and two jacking mechanisms to execute the elementary operations of lifting, lowering and sustaining aloft two of the containers placed alongside the railway track, the jacking mechanism being preferably oil-operated to properly effectuate the aforestated operations. Also provided are removable means to steady the containers during shifting thereof, means for the simultaneous control of the jacking mechanisms, means to attain the exact synchronism of the simultaneous control means for determining the weight of the cargo to be transferred during the operation, and means to allow for the simultaneous control of the jacking mechanisms or of only one of them independently of the other. It is to be understood that the apparatus of this invention may include and operate with only a single jacking mechanism. The advantage of installing two jacking mechanisms along the same railroad track, for example, is, however, self-evident in that it allows in rapid succession the unloading of a container from a vehicle set over the first jacking device and immediately thereafter the loading in the same vehicle of another container already suspended aloft by the second jacking mechanism and under which container the vehicle is rapidly moved from its previous position over the first jacking device.

The installation of two jacks also permits simultaneous loading and unloading of two vehicles at a time.

The apparatus according to this invention, will be hereinafter better described making reference to a specific embodiment thereof which is given only by way of an example and is meant in no way to limit the scope of the invention.

The apparatus includes a preferably fluid operated jacking mechanism to lift, sustain aloft and lower loads, and a single control station therefor. As explained above and as it will be hereinafter detailed in the description of a specific embodiment thereof, the apparatus permits the weighing of the cargo or load lifted so as to eliminate the necessity of a separate weighing operation.

The apparatus, according to this invention, as it will hereinafter be described in detail, allows for an exact synchronism of all the jacks of each jacking mechanism.

The apparatus given by way of example, is illustrated in the accompanying drawings, in which:

FIG. 1 is a diagrammatic longitudinal elevational view of the apparatus showing the double setting feature of the invention which is formed by two similar single jacking mechanisms and showing in the stall at the right a flat railway freight car, while a road trailer is seen in the stall at the left of the apparatus;

FIG. 2 shows a top plan view of the structure in FIG. 1;

FIG. 3 shows a detailed diagrammatic arrangement seen from the top of the fluid operated jacking system and showing the manner of coupling of the jacks of each mechanism one to another and to the control station;

FIG. 4 is a diagrammatic elevational view of the control station;

FIGS. 5, 6 and 7 are diagrammatic elevational end views of one of the double settings, showing the longitudinal beams between which is located a flat railway-car loaded with a container, the three figures showing three successive stages of the balanced lifting of the container from the "frame" of the railway-car;

FIGS. 8 and 9 illustrate elevational side views partially in section of the jacking structure mechanism, with the working elements shown in the positions assumed at the different stages in the lifting operation as indicated in FIGS. 5 and 7;

FIG. 10 is an elevational view of the structure in FIG. 9 as seen from the left hand or track side;

FIG. 11 is a fragmentary enlarged sectional view of the top portion of the structure shown in FIG. 9;

FIG. 12 is an enlarged sectional view along the line 12—12 of FIG. 10 in the direction of the arrows;

FIG. 13 shows on an enlarged scale a longitudinal sectional view of one of the oil-operated jacking elements of the beams taken along line 13—13 of FIG. 14 in the direction of the arrows;

FIGS. 14 and 15 show respectively horizontal sectional views of the body of jacks taken along the lines 14—14 and 15—15 of FIG. 13 in the direction of the arrows; and FIG. 16 shows diagrammatically a preferred embodiment of the piping arrangement for only one of the twin apparatuses and more specifically for the one shown on the left hand showing the connections of the respective feeding and balancing lines.

Referring to the drawings, the apparatus according to this invention is composed of two identical oil-operated jacking mechanisms A and B (FIGS. 1 and 2) placed on both sides of railway track C, both controlled from a single central station D.

In view of the similarity of the two jacking mechanisms A and B, their respective constituent parts will be hereinafter identified by the same reference characters, except that the corresponding reference characters of mechanism B will also be primed.

Each of the mechanisms in A and B is composed of four identical structures: 1, 2, 3 and 4 and 1', 2', 3' and 4', respectively, for the respective jacks 5, 6, 7 and 8 and 5', 6', 7' and 8'.

A standard railway flat-car E for freight service (see FIGS. 1 and 2), and a motor vehicle trailer F are each loaded with a cargo container Z which is equipped with a supporting bottom frame $Z_1$.

Owing to the fact that each structure and its respective jacks are perfectly identical, hereinafter, only structure 1' and its jack 5' pertaining to mechanism B will be described, with the understanding that the description also applies to all of the identical parts thereof.

The structure 1' (FIGS. 8, 9 and 10) is provided with two rigid lateral jaws $a$ equipped with guiding borders or cam means $b$, between which slide cam followers or rolls $c$ held in position by the operating lever or tilting element $d$, which is fulcrumed at $e$ to the piston $l$ of jack 5'.

The lateral jaws $a$ of the structure are integral with a base $f$ set firmly in the ground, and to which is fixed, fulcrumed at $g$, the base $k$ of the jacking element 5'.

In FIG. 11 is shown the tilting bracket or operating lever $d$ supporting one of the beams L, preferably an I-beam with wide side plates. Bracket $d$ is provided with a member $d_1$, which in its turn, is equipped with a channel piece $d_2$, secured to member $d_1$ as by welding. On the inner wall of one of the side plates of beam L is an elongated piece $L_1$ of substantially square section, which piece can be slid into the channel piece $d_2$ so as to hold beam L securely on operating lever $d$. Thus, when it is necessary, it is possible to slide beams L longitudinally to take them away or else outside the guiding action of brackets $d$. A noteworthy structural feature of this invention is that the beams L, which generally in the known art are an integral part of the container for stiffening its bottom, thus allowing it to be strong enough to sustain the stress of the lifting operation and the like, are instead according to this invention taken away from the container thus substantially reducing its dead-weight. The beams L form part of the lifting apparatus of this invention and are brought to bear under the container (by the action of the oil-dynamic devices) only at the time of the transferring step in the operations of lifting, sustaining and lowering of the load during the shifting of the carrying vehicles. Another feature of the beams L is its mobility in the longitudinal direction (axially to the track), in order to prevent damage to the jacks and structures by occasional sudden impacts.

Each of the jacks 5' (FIG. 13) carries a couple of coaxial cylinders $h$ and $i$, both fastened to the base $k$.

Between coaxial cylinders $h$ and $i$ there slides freely, yet without leakage, the cylindrical element or piston $l$ of the jack. It can be noticed in the drawings that between elements $h$ and $i$ and the piston $l$ are formed two distinct hydraulic chambers $m$ externally and internally surrounding cylinder $i$ and also an annular chamber $n$ externally surrounding piston $l$.

Between the base $k$ of cylinder $h$ and the enlarged lower part $l_1$ of piston $l$ a chamber $n_1$ is provided which is suitably connected with proper piping to control station D (see FIG. 3).

With reference to FIGS. 3 and 16, piping 9, 10, 11 and 12 of apparatus A and respectively 9', 10', 11' and 12' of apparatus B directly or indirectly connect the various jacks to control station D.

Piping 13, 14, 15 and 16 (and respectively 13', 14', 15' and 16') join the various jacks together in order to balance their internal pressure as hereinafter described.

More specifically, as exemplified in apparatus B, pipe 14' joins the top portion of annular chamber $n$ of jack 5' with the lower part of annular chamber $m$ of jack 7', pipe 15' joins the top portion of chamber $n$ of jack 7' with the bottom portion of chamber $m$ of jack 8'; and pipe 16' joins the top part of chamber $n$ of jack 8' with the lower part of chamber $m$ of jack 6' with the lower part of chamber $m$ of jack 5'.

With reference to FIGS. 3 and 4, the central control station D is fitted with two sets of electrically driven pumps $p$ and $p'$, both provided with universal directional connections (not shown in the drawings) and a standard oil tank $q$ for the reserve of the operating fluid, preferably oil, and valves $r$ and $r'$ to control and adjust the pressure of the oil, in order to be able to "read" on pressure gauges M and M' (of the type with dials scaled in pound pressure and hundredweights) the weight of the sustained load at the time of the shifting of the carrying vehicles underneath.

Another feature is that of the controlling distributors or levers that have three settings, that is: a raised position at $s$, $s'$ in which there has been an elevation of beams L for the lifting of the cargo container Z (see FIG. 7); a lowered position $s_1$ and $s'_1$ of the control levers which causes the return of actuating fluid in tank $q$ and the consequent lowering of beams L, the oil at this stage going through filters $u$; and a horizontal or neutral position $s_2$ and $s'_2$ of the control levers in which the flow of oil in the circuit is blocked, the apparatus standing still with the load Z lifted, while motor-pumps $p$ and $p'$ are still running in a closed cycle with the fluid discharging through relief valves (not shown). Between the control levers and connected loading piping or feeders to apparatuses A and B suitable intercepting means are interposed such as needle valves $t$ and $t'$ for blocking the jacks in the raised position. Needle valves $t$ and $t'$ are connected with a length of pipe $x$, on which another valve R is interposed (for instance also of the needle type), for the purpose of stopping the apparatus of either mechanism A or B, for various operating reasons, hereinafter described.

Pumps $p$ and $p'$ are each equipped with an individual push-button electric switch $v$, $v^1$, respectively.

Following the above description, the operation of the apparatus, according to this invention, can be summarized as follows: In order that the apparatus will operate in accordance with the basic conceptions of this invention, that is: with absolute safety, ease of control, quickness of movements of the different parts constituting the whole and with absolute synchronism, it is essential that all of the annular chambers and pipes—connecting the various jacking elements—be filled with fluid, preferably oil. For this purpose auxiliary inlets N and P (see FIGS. 13 and 14) are provided on each jack, these auxiliary entrances being plugged with suitable plugs after each refilling. When the whole apparatus has been filled with oil it is to be assumed that all the jacking elements are in the lower position, that: inactive, in the state indicated in FIGS. 5, 6, 13 and 16.

With the control levers (FIG. 4) in the upper position S, $S^1$ the pumps $p$ and $p'$ start their action to increase the oil pressure which is transmitted in the chambers $n_1$ of all the jacks, and this causes the piston $l$ to rise which in turn makes the bracket $d$, provided with rollers or cam followers C, slide upward in the structures 1 guided in the slides or cam guides $b$. However, guides $b$ provide another important movement, according to this invention, namely a movement that brings brackets $d$ toward the longitudinal axis of the vehicle that has been positioned between the beams L (see FIG. 6). This movement causes the jacks to be pivoted at fulcrum g on the base f of the structure (see FIGS. 8–9 and 10).

With the mounting of the oil pressure in the chambers $n_1$ of the jacks, the brackets d are raised so that the beams L come in contact with the bottom $Z_1$ of container Z. The bottom $Z_1$ is of such strength as not to become distorted in shape by the pressure of beams L (see FIGS. 7–9 and 10). In the position of greatest rise the jacks appear as illustrated in FIG. 9. In this position the loaded container Z rests solely on the beams L, thus freeing the vehicle on which it had been resting so that this vehicle can be pushed aside to make room for another on which the loaded container will reach its final destination. To lower the container onto the new vehicle the operational sequence of the jacks and brackets is consequently reversed. It is of course understood that the containers Z when in transit are secured to the frame of their respective vehicles as by bolts or the like which are removed before the container is raised. When the container is lowered onto the frame of a new vehicle, it is of course once again secured by similar means.

To achieve full and exact synchronism for all jacking elements in the oil-dynamic devices, according to this invention a regulated control system has been provided, which balances the action of the jacks, offsetting any disalignment that might arise from an uneven weight distribution in the load applied to them.

According to this invention this important feature has been attained by providing adequate dimensions for each chamber m and n in the jacks (see FIG. 16), and their connecting pipes. When the jacks are at rest, the chambers n and m have equal capacity.

The chambers n and m are substantially leak-proof and are always filled with oil. When, for example, the piston l is advanced from the position shown in FIG. 6 to the position shown in FIG. 9 in which the beams L are raised aloft, the chambers n and m change volumes, but they are so designed that an increase in the volume of chamber n of any of the jacks is compensated by a decrease in the volume of chamber m of the next succeeding jack connected thereto in the piping arrangement.

The oil that is in excess in the chambers n is thus discharged into the chambers m connected thereto, thus, the relative volume changes in the chambers n and m in the cycle compensate exactly and their combined volume remains the same.

However, in order to ensure that the oil in the closed cycle will always provide the reciprocal compensation control and synchronous operation attained by this invention it is essential, in the actuation of the jacking elements of each apparatus, that the oil in excess for instance in chamber n of jack 6' be fed to chamber m of jack 5' by way of pipe 13', and not left to compensate for the lost volume of chamber m in the same jack 6'.

The pipes should be connected to all of the jacks of each apparatus A and B so that as in the case of apparatus B, for example, upon the raising of piston l in the jacks 5', 6', 7' and 8', there will be generated a consecutive flow motion of the oil, which will occur simultaneously in all the four jacks of each apparatus, exactly as has been stated before relative to jacks 5' and 6', that is: consecutive flow of oil from chamber n of jack 5' through pipe 14' into chamber m of jack 7': from chamber n of jack 7' through pipe 15' into chamber m of jack 8', from chamber n of jack 8' through pipe 16' into chamber m of jack 6', and from chamber n of jack 6' (as mentioned before) through pipe 13' into chamber m of jack 5'.

From the above it is plain that the exact synchronism of control has been attained as required.

When lowering the jacks there occurs a diminution of volume in the chambers m and inversely an increase in the volume of chambers n so as to cause an inversion in the flow motion of oil through the pipes 13', 14', 15' and 16' of apparatus B; and 13, 14, 15 and 16 of apparatus A.

To direct the oil power to both the A and B apparatuses, the pumps p, p' are actuated, the valves r, r', t, t', and r are opened, and the control levers shown in FIG. 4 are brought to the s and s' position.

In order to attain quicker action from a single apparatus as for example apparatus A, one may bring both pumps p and p' to bear at one time, but then valve t' should be closed, as it is connected with apparatus B, and valve R should be opened.

The procedure is analogous for the apparatus B.

When valve R is closed, each pump generates power for its respective apparatus. However, it is possible to actuate both apparatuses A and B at one time from a single pump, for instance when one pump is disabled or is being kept idle, but to accomplish this valves t and t' and R should be kept open. To lower the loads the control levers should be brought to position $s_1$ and s' and the return of the oil to the tank q occurs through pipes u and u'.

The apparatuses according to this invention permit as has been before mentioned, the measurement or reading on pressure gauges M and M' of the weight of each of the containers Z being raised by the jacking elements.

However, to be able to read directly on the pressure gauges M and M' the weight of the respective containers, the scales on the dials of the pressure gauges are to be marked directly in pound pressure and hundredweights.

It may be difficult to obtain exact readings owing to the size of load to be weighted and to the fact that the pointer of the gauges may fluctuate due to vibration of pump action, which alone can impair the readings.

In order to avoid the vibrations, after having raised the load, a part of the apparatus including the jacks should be momentarily isolated by interrupting the flow of oil to the jacks and bringing the control levers to the intermediate position, substantially horizontal, as indicated in FIG. 4 of the drawing by $s_2$ and $s'_2$. For greater safety, valves r and r' can be momentarily closed. However, pumps p and p' should not be stopped but should continue to pump the oil in the closed circuit formed (for instance in apparatus B) between the elements p', r', s', u' and q of the apparatus, without reaching the jacks. In this manner the pointers on the pressure gauges cease to oscillate and easy, rapid and exact readings can be obtained at a glance.

To compute the net weight of goods from the gross weight of the suspended load, the tare weight of container Z may simply be deducted from the gauge reading.

It will be understood that each of the elements described above, or two or more together, may also find a useful application in other types of transferring installation differing from the types described above.

While I have illustrated and described the invention as embodied in a transferring installation, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claim.

What is claimed as new and desired to be secured by Letters Patent is as follows:

A loading apparatus comprising, in combination, a loading station including two spaced groups of hydraulic raising and lowering units respectively adapted to be located on opposite sides of a roadway for vehicles to be loaded and unloaded, each of said units including a cylinder mounted for pivotal movement transverse to said roadway, a piston reciprocable in said cylinder and adapted to be raised and lowered by hydraulic pressure, an operating lever pivotally mounted on said piston and being movable with said unit in said transverse direction, cam follower means on said operating lever, cam means for operating with said cam follower means for guiding said operating lever during raising of said piston to turn in said transverse direction so that said units of said groups pivot toward each other and portions of said levers move toward each other and from a position located outwardly of a load to a position located below the load while being raised by said piston; and two supporting means mounted on said portions of said operating levers of said two groups of units, respectively, so as to be raised and lowered by the same and adapted to engage a load on a vehicle on the roadway for raising and lowering the load and the control of said units, said supporting means being mounted on said portions slidable in the direction of the roadway.

References Cited in the file of this patent

UNITED STATES PATENTS

| | | |
|---|---|---|
| 800,167 | Morgan | Sept. 26, 1905 |
| 977,705 | Bryan | Dec. 6, 1910 |
| 982,977 | Morgan | Jan. 31, 1911 |
| 1,581,153 | Anthony et al. | Apr. 20, 1926 |
| 1,646,759 | McCall | Oct. 25, 1927 |
| 1,903,431 | Abbe | Apr. 11, 1933 |
| 1,982,711 | Vickers | Dec. 4, 1934 |
| 2,069,236 | Fitch | Feb. 2, 1937 |
| 2,119,902 | Blood | June 7, 1938 |
| 2,471,364 | Weber | May 24, 1949 |
| 2,560,131 | Sasgen et al. | July 10, 1951 |
| 2,715,971 | Cox | Aug. 23, 1955 |
| 2,828,040 | Fitton et al. | Mar. 25, 1958 |
| 2,851,171 | Martin et al. | Sept. 9, 1958 |

FOREIGN PATENTS

| | | |
|---|---|---|
| 83,613 | France | Dec. 16, 1868 |
| 506,186 | Great Britain | May 24, 1939 |
| 787,521 | Great Britain | Dec. 11, 1957 |